(12) United States Patent
Hsu (10) Patent No.: US 11,768,331 B2
(45) Date of Patent: Sep. 26, 2023

(54) FIBER OPTIC CONNECTOR

(71) Applicant: Gloriole Electroptic Technology Corp., Kaohsiung (TW)

(72) Inventor: Hsien-Hsin Hsu, Kaohsiung (TW)

(73) Assignee: GLORIOLE ELECTROPTIC TECHNOLOGY CORP., Kaohsiung (TW)

(*) Notice: Subject to any disclaimer, the term of this patent is extended or adjusted under 35 U.S.C. 154(b) by 0 days.

(21) Appl. No.: 17/687,104

(22) Filed: Mar. 4, 2022

(65) Prior Publication Data
US 2023/0003946 A1 Jan. 5, 2023

(30) Foreign Application Priority Data
Jul. 2, 2021 (TW) .................. 110207743

(51) Int. Cl.
*G02B 6/36* (2006.01)
*G02B 6/38* (2006.01)

(52) U.S. Cl.
CPC ........... *G02B 6/3825* (2013.01); *G02B 6/387* (2013.01); *G02B 6/3885* (2013.01); *G02B 6/3893* (2013.01); *G02B 6/3897* (2013.01)

(58) Field of Classification Search
CPC .... G02B 6/3825; G02B 6/387; G02B 6/3885; G02B 6/3893; G02B 6/3897; G02B 6/36
See application file for complete search history.

(56) References Cited

U.S. PATENT DOCUMENTS 11,543,598 B2 * 1/2023 Hsu ...................... G02B 6/3878

FOREIGN PATENT DOCUMENTS

CN 213338111 U * 6/2021

* cited by examiner

*Primary Examiner* — Jennifer Doan
(74) *Attorney, Agent, or Firm* — Muncy, Geissler, Olds & Lowe, P.C.

(57) ABSTRACT

A fiber optic connector includes a ferrule, an insert body, a tail sleeve and two core heads. The ferrule includes an outer frame, and an operating handle extending rearwardly from the outer frame. The outer frame is formed with an inserted opening open along a front-rear direction and two limiting slots open along a left-right direction and spaced apart from each other along the left-right direction. The insert body is detachably inserted into the ferrule and includes two protrusion units protruding away from each other along the left-right direction and respectively movable in the limiting slots.

9 Claims, 6 Drawing Sheets

FIBER OPTIC CONNECTOR

CROSS-REFERENCE TO RELATED APPLICATION

This application claims priority of Taiwanese Utility Model Patent Application No. 110207743, filed on Jul. 2, 2021.

FIELD

The disclosure relates to a connector, more particularly to a fiber optic connector.

BACKGROUND

Figure 1:
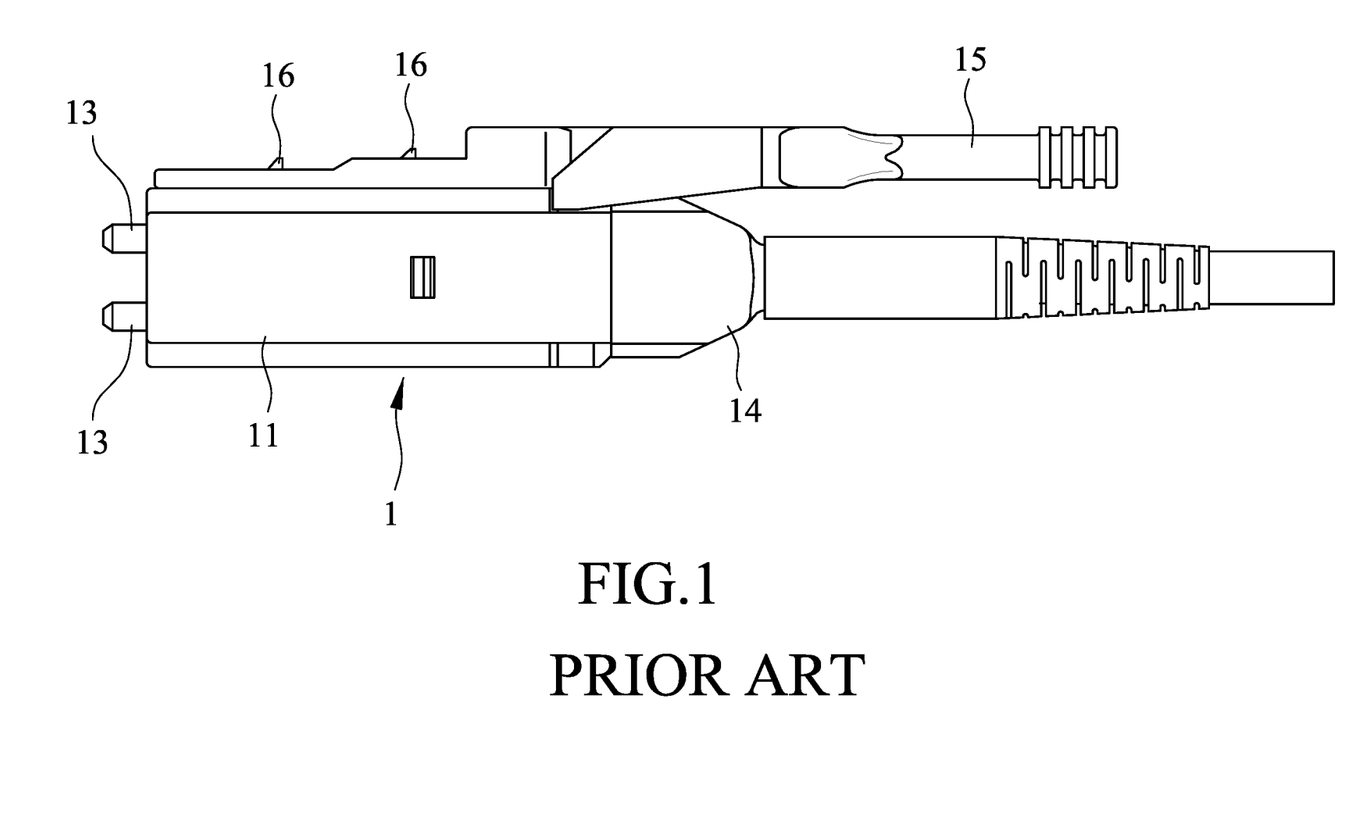
FIG. 1 is a schematic side view of a conventional optical fiber connector.
Figure 2:
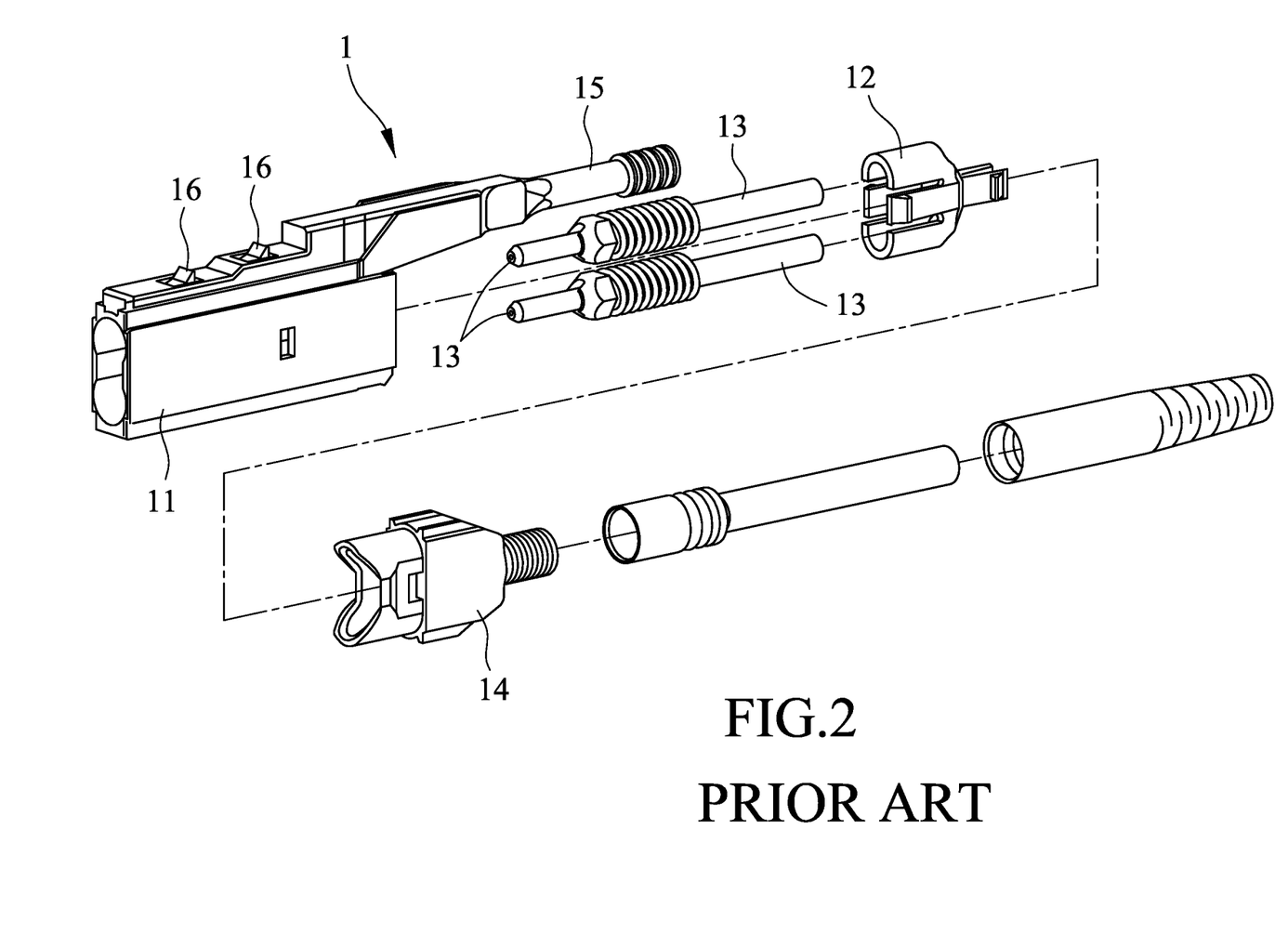
FIG. 2 is an exploded perspective view illustrating the structure of the conventional optical fiber connector shown in FIG. 1.

With continuous advancement of data transmission technology, new specifications, such as a four-channel quad small form-factor pluggable (QSFP) interface, for optical fiber connectors of high speed optical fibers are developed. Referring to FIGS. 1 and 2, a conventional optical fiber connector 1 includes a casing body 11, a head sleeve 12 disposed in the casing body 11, two core heads 13 mounted between the casing body 11 and the head sleeve 12 and arranged vertically spaced apart from each other, a tail sleeve 14 connected removably to a rear end of the casing body 11, a handling lever 15 disposed on the casing body 11 and extending rearwardly, and two engaging members 16 extending from the casing body 11 upwardly. When it is desired to connect the optical fiber connector 1 to an adaptor or a socket (not shown), the casing body 11 is inserted into the adapter or the socket, and at least one of the engaging members 16 is engaged into a slot formed in the adaptor or the socket, such that the core heads are connected with another two core heads (not shown) inserted into the adaptor or the socket, respectively. By use of various pairing modes of the core heads 13, a change in polarity of connection can be achieved.

When adjusting the polarity of the conventional optical fiber connector 1, it is required to remove the optical fiber connector 1 from the adaptor or the socket. Then, the optical fiber connector 1 is inverted and is inserted into the adaptor or the socket again. However, engagement between the engaging members 16 and the slots formed in the adaptor or the socket results in difficulty of removal of the optical fiber connector 1 from the adaptor or the socket, which in turn results in wearing of the engaging members 16 and the adaptor or the socket and even breakage of the engaging members 16. Further, in a case where a plurality of the conventional optical fiber connectors 1 with different polarities are arranged side-by-side, it is difficult to arrange the optical fiber connectors 1 neatly since some of the handling levers 15 are located above the casing bodies 11, while the remaining handling levers 15 are located below the casing bodies 11.

The polarity of the optical fiber connector 1 can also be adjusted by first removing the tail sleeve 14 from the casing body 11. Next, the head sleeve 12 is detached from the casing body 11 and the core heads 13 are removed from the casing body 11 to exchange positions of the core heads 13. Then, the core heads 13 are mounted to the casing body 11 again. However, the optical fibers in the tail sleeve 14 may be damaged during the cumbersome assembly and disassembly procedures.

SUMMARY

Therefore, an object of the disclosure is to provide a fiber optic connector that can alleviate at least the drawback of the prior art.

According to an aspect of the disclosure, a fiber optic connector includes a ferrule, an insert body, a tail sleeve and two core heads. The ferrule includes an outer frame, and an operating handle extending rearwardly from the outer frame along a front-rear direction. The outer frame is formed with an inserted opening that is open along the front-rear direction and two limiting slots that are open along a left-right direction transverse to the front-rear direction and that are spaced apart from each other along the left-right direction. The insert body is detachably inserted into the ferrule and includes two protrusion units protruding away from each other along the left-right direction and respectively and detachably engaging the limiting slots. The tail sleeve is sleeved on a rear end of the insert body. The core heads extend movably through the inserted opening of the outer frame along the front-rear direction, are inserted fixedly into a front end of the insert body, and are spaced apart from each other along an up-down direction that is transverse to the front-rear direction and the left-right direction.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 3:
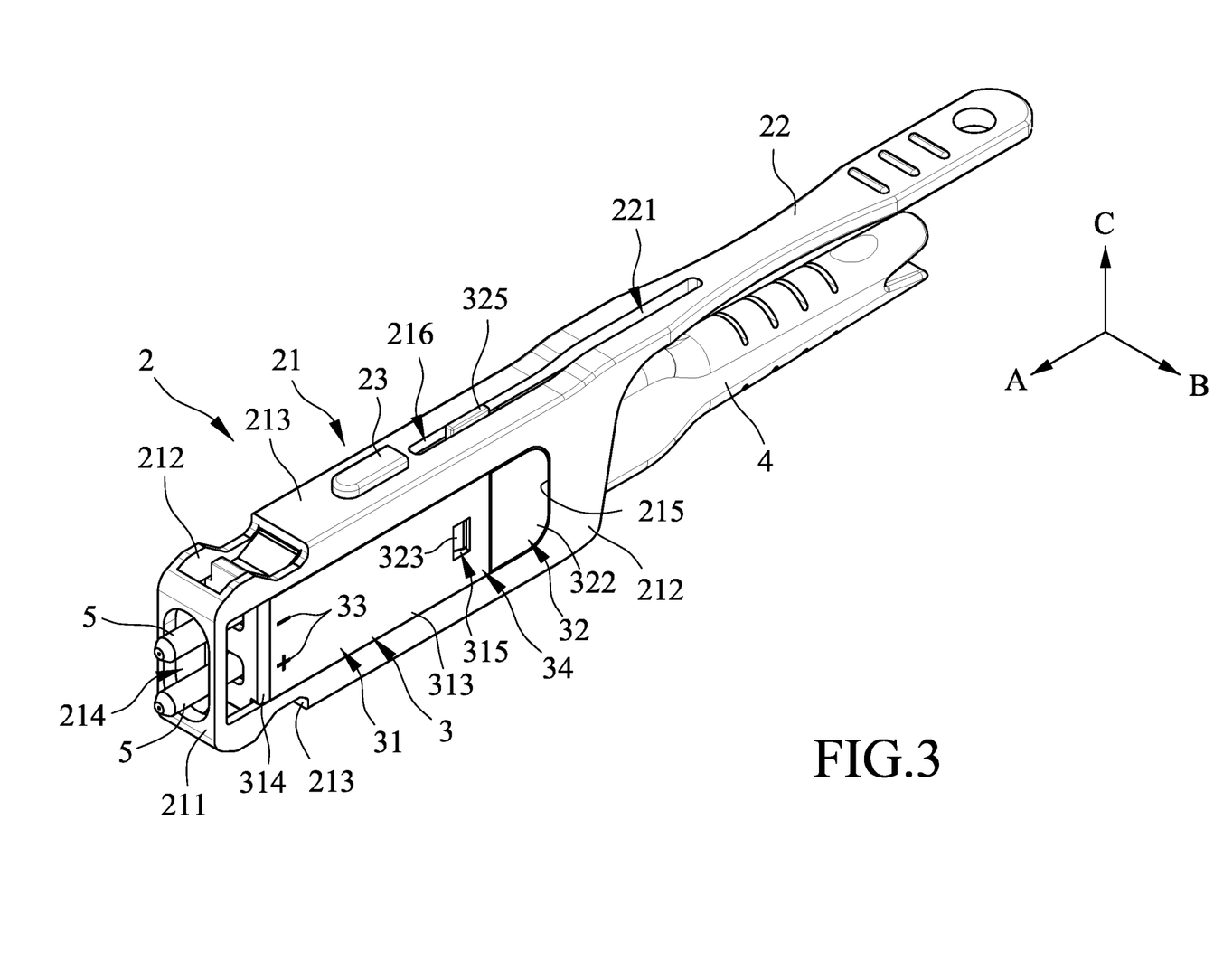
FIG. 3 is a perspective view of a fiber optic connector according to an embodiment of the present disclosure.
Figure 4:
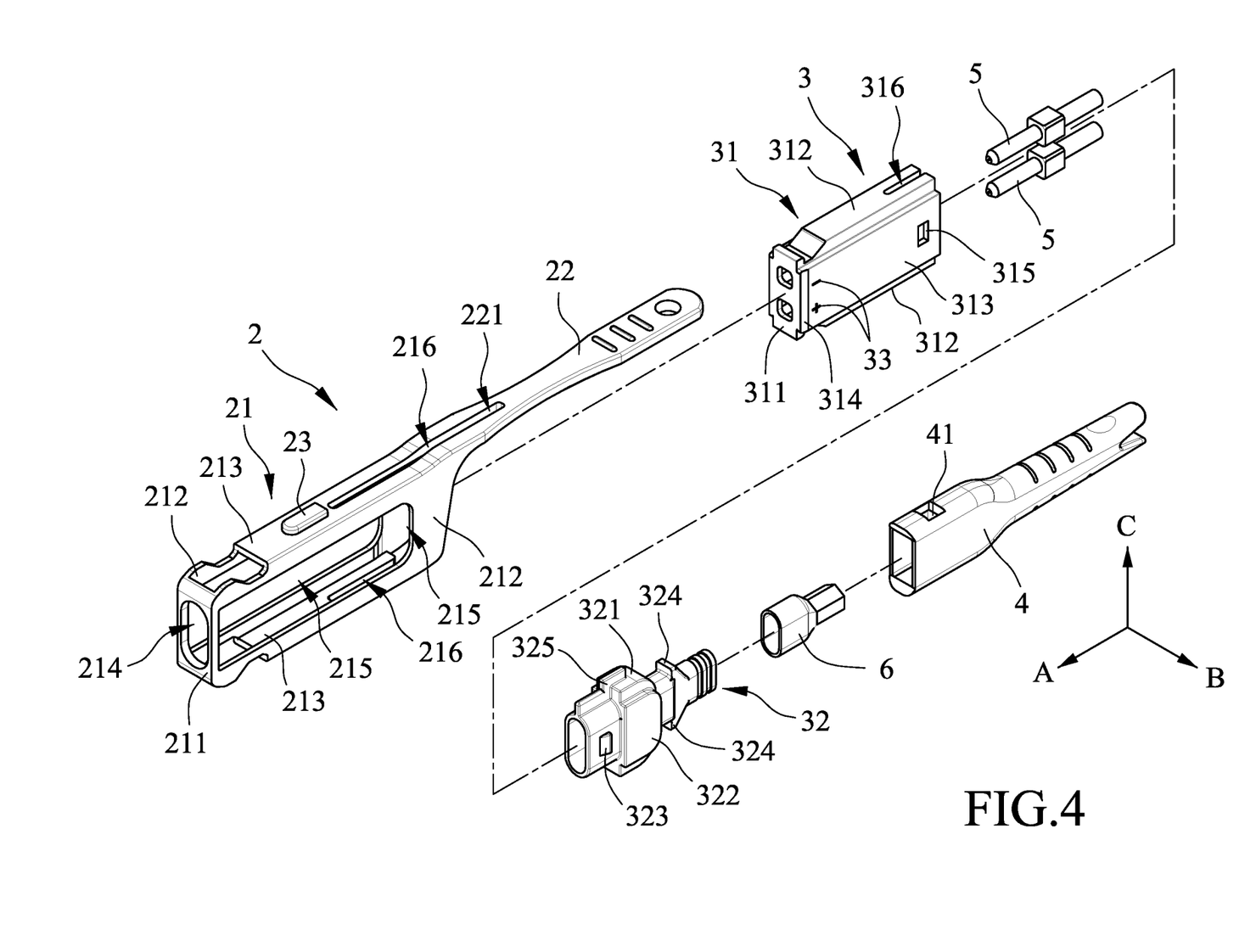
FIG. 4 is an exploded perspective view of the embodiment, illustrating relationships among elements of the embodiment.
Figure 5:
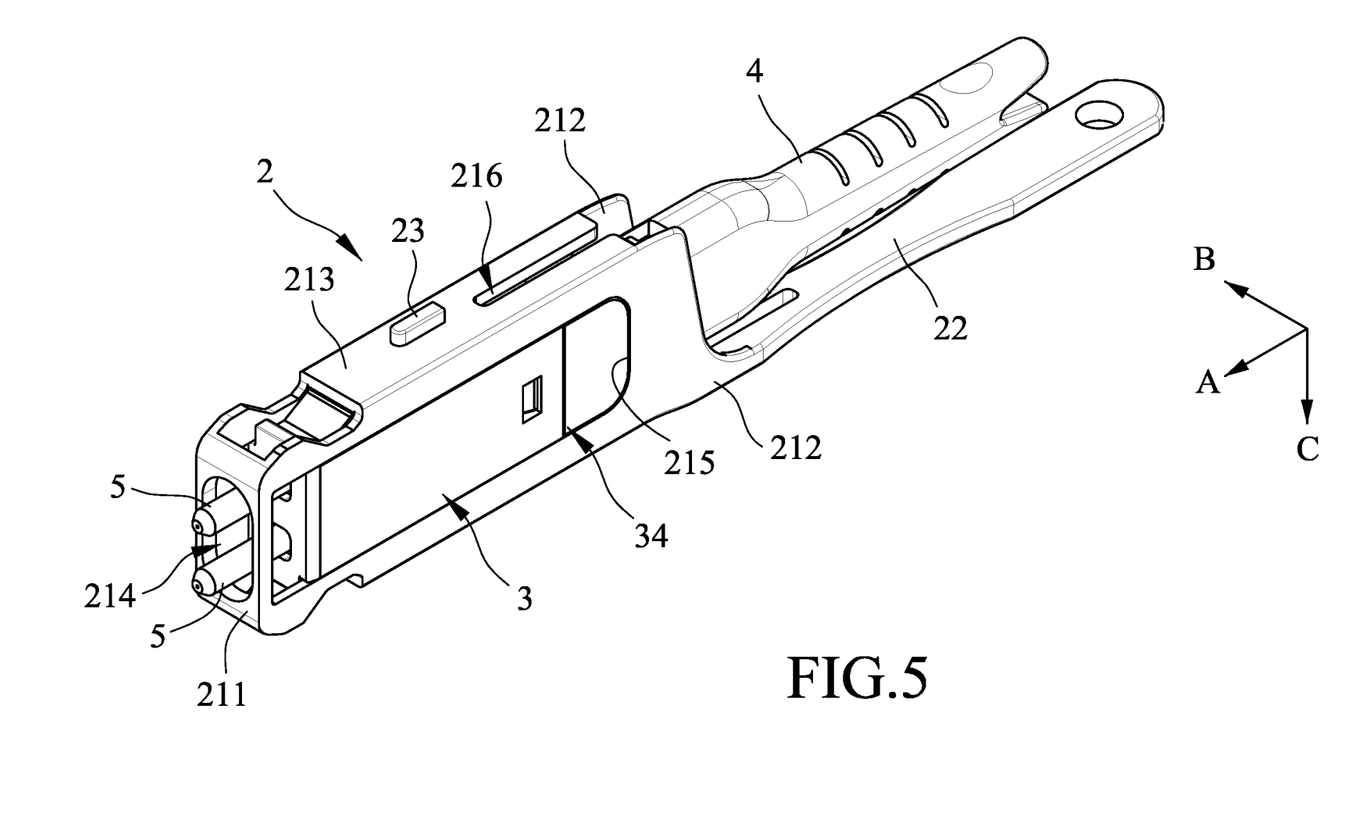
FIG. 5 is a perspective view illustrating the fiber optic connector of the embodiment being inverted.

Referring to FIGS. 3 to 5, an embodiment of a fiber optic connector according to the present disclosure is shown. The fiber optic connector includes a ferrule 2, an insert body 3 detachably inserted into the ferrule 2, a tail sleeve 4 sleeved on a rear end of the insert body 3 along a front-rear direction (A), and two core heads 5 extending removably into a front end of said ferrule 2 and spaced apart from each other along an up-down direction (C) transverse to the front-rear direction (A).

The ferrule 2 includes an outer frame 21, an operating handle 22 extending rearwardly from the outer frame 21 along the front-rear direction (A), and two engaging members 23 (only one is visible) protruding from the outer frame 21 along the up-down direction (C) away from each other and adapted to be connected to an adaptor. The outer frame 21 of the ferrule 2 includes a front frame portion 211, two lateral frame portions 212 connected to the front frame portion 211, extending along the front-rear direction (A), and spaced apart from each other along a left-right direction (B) transverse to the front-rear direction (A) and the up-down direction (C), and two connecting wall portions 213 (only one is visible) spaced apart from each other along the up-down direction (C) and connected to the lateral frame portions 212. The front frame portion 211 surrounds and defines an inserted opening 214 that is open along the front-rear direction (A). Each of the lateral frame portions 212 is formed with a limiting slot 215 open along the left-right direction (B). Each of the connecting wall portions 213 is formed with a sliding slot 216 that extends along the front-rear direction (A) and open rearwardly. The operating handle 22 is integrally connected to the lateral frame portions 212 and one of the connecting wall portions 213, and is formed with a slot 221 extending along the front-rear direction (A), open forwardly, and in spatial communication with the sliding slot 216 of the corresponding one of the connecting wall portions 213 to constitute a slot unit. The engaging members 23 protrude respectively from the connecting wall portions 213 of the outer frame 21 away from each other, i.e., one of the engaging members 23 protrudes upwardly and the other one of the engaging members protrudes downwardly.

Figure 6:
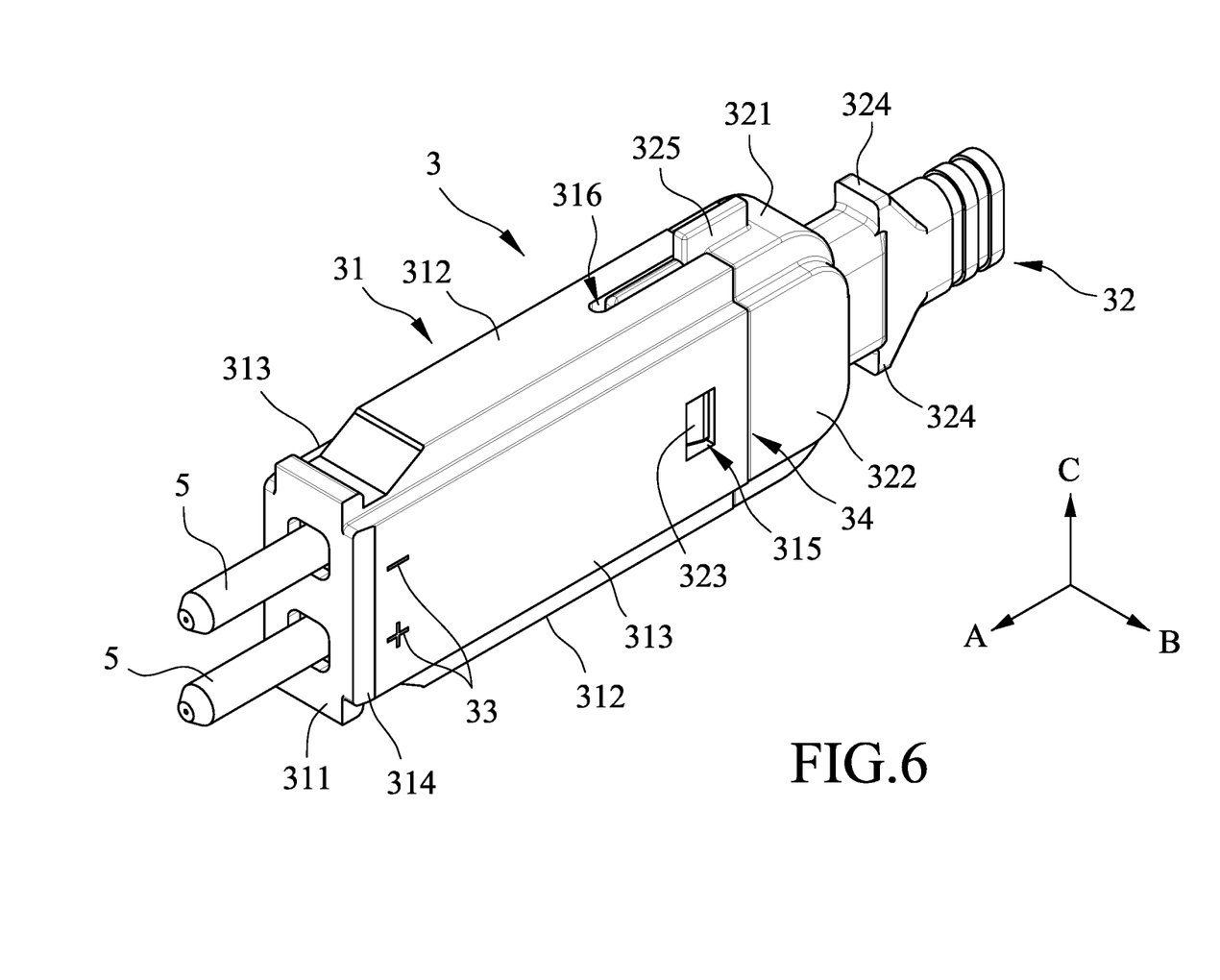
FIG. 6 is a perspective view of an insert body and two core heads of the embodiment of the fiber optic connector according to the present disclosure.

Further referring to FIG. 6, the insert body 3 is disposed in the outer frame 21, and includes a casing sleeve 31 permitting the core heads 5 to extend thereinto, a receiving seat 32 connected to a rear end of the casing sleeve 31, and a plurality of polarity-representing marks 33.

The casing sleeve 31 includes a front wall portion 311, two protruding portions 312 which extend respectively and rearwardly from two end portions of the front wall portion 311 that are opposite to each other along the up-down direction (C), and two lateral wall portions 313 which are spaced apart from each other along the left-right direction (B) and each of which is connected to the front wall portion 311 and the protruding portions 312. Each of the lateral wall portions 313 of the casing sleeve 31 has a front inclined surface 314 inclined rearwardly and outwardly along the front-rear direction (A), and has an engaging slot 315 formed therethrough along the left-right direction (B). One of the protruding portions 312 is formed with a positioning slot 316 extending rearwardly along the front-rear direction (A). The positioning slot 316 is aligned with the sliding slot 216 along the up-down direction (C).

The receiving seat 32 includes a seat portion 321 connected to a rear end of the casing sleeve 31, two boss portions 322 (only one is visible) protruding respectively from the seat portion 321 and away from each other along the left-right direction (B), two tenon portions 323 (only one is visible) protruding away from each other from the seat portion 321 along the left-right direction (B), two engaging portions 324 protruding from the seat portion 321 away from each other along the up-down direction (C) and disposed behind the tenon portions 323, and a polarity adjusting portion 325 protruding from the seat portion 321 along the up-down direction (C), extending through the positioning slot 316 of the casing sleeve 31 and the slot unit of the ferrule 2 along the up-down direction (C) and having a portion exposed outwardly of the ferrule 2. Each of the lateral wall portions 313 is movable along the front-rear direction (A) to contact a respective one of the boss portions 322 to constitute a protrusion unit 34. The two protrusion units 34 of the insert body 3 protrude away from each other along the left-right direction (B) and respectively and detachably engage the limiting slots 215 of the connecting wall portions 213. Each of the limiting slots 215 has a dimension along the front-rear direction (A) greater than a length of a corresponding one of the protrusion units 34 along the front-rear direction (A), so that the insert body 3 is movable relative to the ferrule 2 along the front-rear direction (A). The tenon portions 323 engage respectively and detachably the engaging slots 315 of the lateral wall portions 313 to position the seat portion 321 relative to the casing sleeve 31, so that the seat portion 321 is positioned relative to the lateral wall portions 313 and located behind the casing sleeve 31. The polarity-representing marks 33 are disposed on one of the lateral wall portions 313, and are exposed in a corresponding one of the limiting slots 215. The polarity-representing marks 33 can be directly printed engraved on outer surfaces of the lateral wall portions 313, or can be implemented by stickers adhered on one of the lateral wall portions 313 in a form of text or patterns. In this embodiment, the polarity-representing marks 33 are respectively presented by symbols of "+" and "−" to indicate the polarities of the core heads 5, and a user can realize the polarity of the fiber optic connector according to the polarity-representing marks 33.

The tail sleeve 4 is formed with two engaging openings 41 (only one is visible) that extend along the up-down direction (C) and that engage respectively and detachably the engaging portions 324. Thus, the tail sleeve 4 is positioned relative to the insert body 3. It should be noted that the fiber optic connector of the this embodiment further includes a connecting sleeve 6 sleeved on the rear end of the insert body 3 and interconnecting the receiving seat 32 and the tail sleeve 4. In this way, wires extending through the fiber optic connector can be arranged neatly in the tail sleeve 4 and the insert body 3. The core heads 5 extends removably through the inserted opening 214 and are inserted fixedly into the front wall portion 311 of the casing sleeve 31. In this embodiment, the heights of the core heads 5 along the up-down direction (C) are the same as those of the symbols "+" and "−" presenting the polarity-representing marks 33, respectively.

In this embodiment, the engaging members 23 are adapted to be connected to a socket or an adaptor. To adjust the polarity of the fiber optic connector, the lateral frame portions 212 are moved away from each other along the left-right direction (B) by a tool or a hand of a user such that the protrusion units 34 are disengaged respectively from the limiting slots 215, thereby allowing the insert body 3 to be removed from the ferrule 2. Then, the insert body 3 is inverted and is inserted into the ferrule 2 again. The structure of the front inclined surfaces 314 of the lateral wall portions 313 pushes the lateral frame portions 212 away from each other to facilitate insertion of the insert body 3 into the ferrule 2 during assembly of the insert body 3 to the ferrule 2. As soon as the front inclined surfaces 314 are moved completely into the limiting slots 215, the lateral frame portions 212 move toward each other to confine the insert body 3 therebetween and the protrusion units 34 are received in and engage the limiting slots 215, respectively. Thus, the insert body 3 is positioned relative to the ferrule 2, and the adjustment of the polarity of the fiber optic connector is finished such that the position of the operating handle 22 would not be changed. At this time, the boss portions 322 are disposed respectively at rear ends of the limiting slots 215. The polarity adjusting portion 325 can be pushed to move forwardly relative to the ferrule 2 along the corresponding sliding slot 216 until the lateral wall portions 313 come into contact with walls of the lateral frame portions 212 defining front ends of the limiting slots 215. In this way, the insert body 3 is moved forwardly relative to the ferrule 2, so that the core heads 5 extend outwardly of the inserted opening 214 to facilitate connection with other elements. It should be particularly noted that, since the polarity adjusting portion 325 extends outwardly of one of the sliding slots 216, polarity of the fiber optic connector can be identified by observing that the polarity adjusting portion 325 protrudes upwardly or downwardly.

In summary, when adjusting the polarity of the fiber optic connector of the present disclosure, it is not required to remove the engaging members 23 from the socket or the adapter connected thereto, and removal of the wires from the fiber optic connector is also not required. Thus, it is more convenient to adjust polarity of the fiber optic connector of the present disclosure as compared to the conventional optical fiber connectors described in the background. Further, it is not necessary to invert the operating handle 22 during polarity adjustment, and a relatively neat arrangement of the optical fiber connector can be achieved. Therefore, the object of the present disclosure can be indeed achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic connector, comprising:
    a ferrule including an outer frame, and an operating handle extending rearwardly from said outer frame along a front-rear direction, said outer frame being formed with an inserted opening that is open along the front-rear direction and two limiting slots that are open along a left-right direction transverse to the front-rear direction and that are spaced apart from each other along the left-right direction;
    an insert body detachably inserted into said ferrule, the insert body including two protrusion units protruding away from each other along the left-right direction and respectively and detachably engaging said limiting slots;
    a tail sleeve sleeved on a rear end of said insert body; and
    two core heads extending movably through said inserted opening of said outer frame along the front-rear direction, inserted fixedly into a front end of said insert body, and spaced apart from each other along an up-down direction that is transverse to the front-rear direction and the left-right direction;
    wherein said outer frame of said ferrule includes a front frame portion surrounding and defining said inserted opening, two lateral frame portions connected to said front frame portion, extending along the front-rear direction, and spaced apart from each other along the left-right direction, and two connecting wall portions spaced apart from each other along the up-down direction and connected to said lateral frame portions, each of said lateral frame portions being formed with a respective one of said limiting slots, said operating handle being connected to said lateral frame portions and one of said connecting wall portions.

2. The fiber optic connector as claimed in claim 1, wherein the ferrule further includes two engaging members protruding respectively from said connecting wall portions along the up-down direction away from each other and adapted to be connected to an adaptor.

3. The fiber optic connector as claimed in claim 1, wherein said insert body includes a casing sleeve permitting said core heads to extend thereinto and a receiving seat connected to a rear end of said casing sleeve, said casing sleeve including
    a front wall portion through which said core heads extend,
    two protruding portions which extend respectively and rearwardly from two end portions of said front wall portion that are opposite to each other along the up-down direction, and
    two lateral wall portions which are spaced apart from each other along the left-right direction and each of which is connected to said front wall portion and said protruding portions,
    said receiving seat including a seat portion connected to a rear end of said casing sleeve, and two boss portions protruding respectively from said seat portion and away from each other along the left-right direction, each of said lateral wall portions being movable to contact a respective one of said boss portions to constitute a corresponding one of said protrusion units.

4. The fiber optic connector as claimed in claim 3, wherein each of said connecting wall portions of said ferrule is formed with a sliding slot extending along the front-rear direction and open rearwardly, said operating handle being formed with a slot extending along the front-rear direction, open forwardly, and in spatial communication with said sliding slot of a corresponding one of said connecting wall portions so as to cooperate with said sliding slot of the corresponding one of said connecting wall portions to constitute a slot unit, one of said protruding portions of said casing sleeve being formed with a positioning slot extending along the front-rear direction, said receiving seat further including a polarity adjusting portion that protrudes from said seat portion along the up-down direction, that extends through said positioning slot of said casing sleeve and said slot unit of said ferrule and that has a portion exposed outwardly of said ferrule.

5. The fiber optic connector as claimed in claim 4, wherein each of said lateral wall portions of said casing sleeve has a front inclined surface inclined rearwardly and outwardly along the front-rear direction so that said lateral frame portions of said insert body are pushed respectively and outwardly by said front inclined surfaces of said lateral wall portions along the left-right direction to facilitate insertion of said insert body into said ferrule during assembly of said insert body to said ferrule.

6. The fiber optic connector as claimed in claim 4, wherein each of said lateral wall portions of said casing sleeve has an engaging slot formed therethrough along the left-right direction, said receiving seat further including two tenon portions protruding away from each other from said seat portion along the left-right direction, and engaging respectively and detachably said engaging slots of said lateral wall portions.

7. The fiber optic connector as claimed in claim 4, wherein said receiving seat of said insert body further includes two engaging portions protruding from said seat portion away from each other along the up-down direction, said tail sleeve being formed with two engaging openings that extend along the up-down direction and that engage respectively and detachably said engaging portions.

8. The fiber optic connector as claimed in claim 4, wherein said insert body further includes at least one polarity-representing mark disposed on one of said lateral wall portions of said casing sleeve and exposed in a corresponding one of said limiting slots.

9. The fiber optic connector as claimed in claim 1, wherein each of said limiting slots has a dimension along the front-rear direction greater than a length of a corresponding one of said protrusion units along the front-rear direction, so that said insert body is movable relative to said ferrule along the front-rear direction.

\* \* \* \* \*